UNITED STATES PATENT OFFICE.

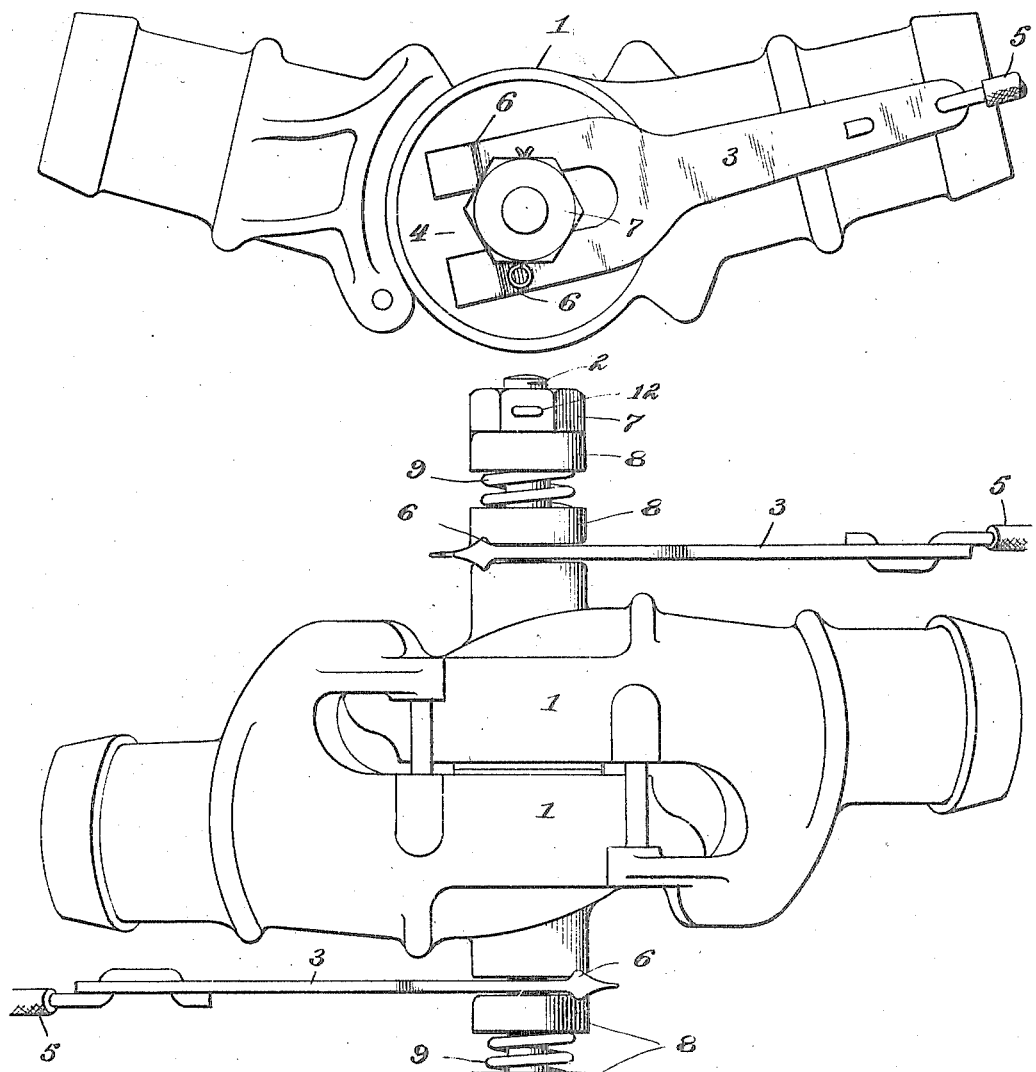

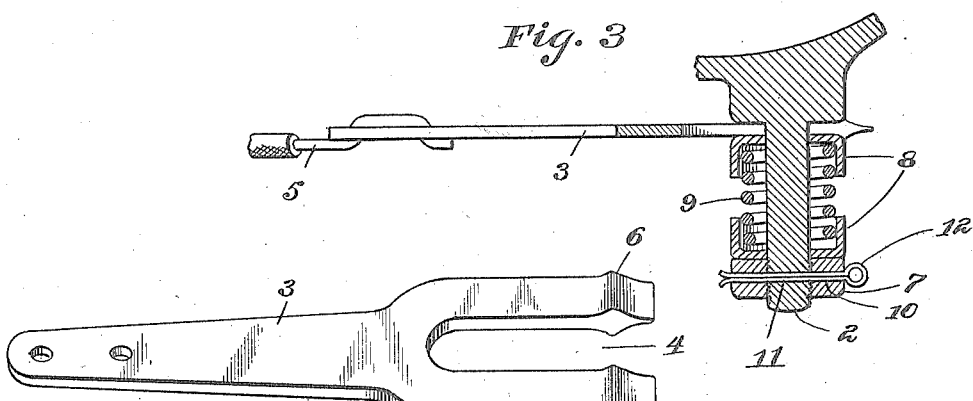
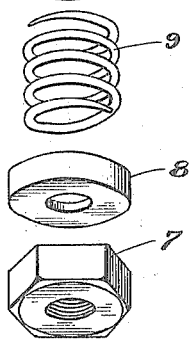
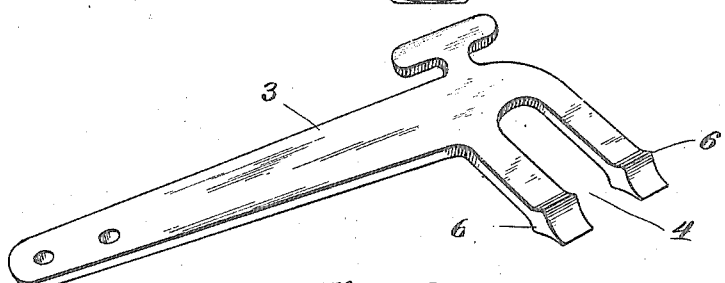

GUSTAF WM. LUNDIN, OF BELLEVUE, IOWA.

CONNECTING DEVICE FOR TRAIN TELEPHONE-LINES.

1,273,246.　　　　　Specification of Letters Patent.　　Patented July 23, 1918.

Application filed October 6, 1916. Serial No. 124,134.

*To all whom it may concern:*

Be it known that I, GUSTAF WM. LUNDIN, a citizen of the United States, residing at Bellevue, in the county of Jackson and State of Iowa, have invented new and useful Improvements in Connecting Devices for Train Telephone-Lines, of which the following is a specification.

This invention relates to improvements in connectors for the telephone and other electric lines of trains.

In carrying out the present invention, it is my purpose to provide a connector of the class described whereby the electrical continuity of the wires carried by the respective cars of the train may be established through the couplings of the air hose of the brake system and whereby the wires on the respective cars will be securely and effectively connected to the couplings of the air hose so as to prevent accidental interrupting of the circuit.

It is also my purpose to provide a connector of the type set forth which will embrace the desired features of simplicity, efficiency and durability, which may be quickly and conveniently connected to the air hose coupling and removed therefrom and which will embody comparatively few parts and these so arranged and correlated as to reduce the possibility of derangement to a minimum.

With the above and other objects in view, the invention consists in the construction, combination and arrangement of parts hereinafter set forth in and falling within the scope of the claims.

In the accompanying drawings;

Figure 1 is a view in side elevation of the companion coupling members of an air hose showing my improved connector applied thereto.

Fig. 2 is a bottom plan view of the same.

Fig. 3 is a fragmentary longitudinal sectional view through one of the members of the coupling and the connector.

Fig. 4 is a collective view showing the parts of the connector in perspective.

Fig. 5 is a perspective detail of a slightly modified form of terminal strip.

Referring now to the drawings in detail, 1, 1 designate the companion members of an air hose coupling, these members being such as are usually carried at the ends of sections of rubber hose 20 which in turn are connected with the train pipes. In accordance with my present invention, a stud 2 is cast integral with the bell of each member 1 and projects outwardly therefrom and the outer end of the stud 2 is threaded. 3 indicates a terminal strip having one end forked as at 4 to straddle the stud 2 and the other end suitably connected to the adjacent end of the car carried wire 5. The arms of the forked end 4 of the strip are thickened as at 6 to form arrow heads adjacent to the outer ends thereof and these thickened portions merge into the adjacent parts of the arms to provide inclined surfaces. Threaded onto the outer end of the stud 2 is a nut 7 and interposed between the nut and the forked end 4 of the strip 3 are cupped washers 8 having the end walls bearing against the nut and the strip respectively. Surrounding the stud between the washers is a coiled expansion spring 9 having the ends thereof seated in the respective washers. The nut 7 is formed with a transverse bore 10 adapted to aline with a similar bore 11 formed in the stud and passed through these alining bores is a cotter pin 12 or other form of nut-retaining device.

In practice, the strip 3 may be disconnected from the stud by pulling upon the strip and in the movement of the strip the inclined surfaces or heads formed at the thickened portions 6 ride over the flat faces of the bell and the adjacent washer and compress the spring 9. To apply the strip to the stud, the forked end thereof is forced between the bell of the coupling and the adjacent washer 8 and the inclined portion of the forked end of the strip compresses the spring 9 so that when the washer is relieved of the influence of these inclined portions, the spring will react to force the washer against the strip, thereby holding the strip effectively connected to the bell of the coupling.

While I have herein shown and described the preferred form of my invention by way of illustration, I wish it to be understood that I do not limit or confine myself to the precise details of construction herein described and delineated, as modification and variation may be made within the scope of the claims and without departing from the spirit of the invention.

For instance, in Fig. 5 I have shown a modified form of terminal strip which may well be employed, wherein the arms of the fork stand at right angles to the length of the strip itself so that strain on the wires would not pull said arms from beneath the innermost washer. In fact, while the specific form of connector herein shown and described is efficient and sufficient for carrying out the purposes of my invention, the broad idea may be said to lie in connecting the ends of each car wire with the bells which are connected by hose with the ends of each car train pipe, and therefore when two cars are connected and the bells of their brake system are coupled, the act of making such coupling automatically connects their train wires electrically.

I claim:

1. In a connector for telephone lines, the combination with a binding post, of a forked conductor terminal adapted to straddle said post, a spring pressed washer carried by the binding post and transversely disposed shouldered portions located upon the opposite faces of the forked conductor terminal to hold the latter in engagement.

2. In a connector for telephone lines, the combination with a binding post, of a forked conductor terminal adapted to straddle said post, a spring pressed washer carried by the binding post and substantially arrow shaped terminals formed on each end of the conductor terminal to provide wedges for positioning the latter and shoulders to prevent its accidental displacement.

In testimony whereof I affix my signature.

GUSTAF WM. LUNDIN.